United States Patent [19]
Hagen et al.

[11] 3,926,966
[45] Dec. 16, 1975

[54] 5-NITROFURAN COMPOUNDS

[75] Inventors: Helmut Hagen; Helmut Fleig, both of Frankenthal, Germany

[73] Assignee: Badische Anilin- & Soda-Fabrik Aktiengesellschaft, Ludwigshafen (Rhine), Germany

[22] Filed: June 6, 1974

[21] Appl. No.: 477,055

[30] Foreign Application Priority Data
June 9, 1973  Germany............................ 2329653

[52] U.S. Cl....... 260/240 A; 260/302 D; 260/347.3; 424/270
[51] Int. Cl.$^2$...................................... C07D 417/06
[58] Field of Search..................... 260/240 A, 302 D

[56] References Cited
UNITED STATES PATENTS

| | | | |
|---|---|---|---|
| 3,470,164 | 9/1969 | Takamatsu et al. ............. | 260/240 A |
| 3,491,091 | 1/1970 | Berger et al. ................... | 260/240 A |

FOREIGN PATENTS OR APPLICATIONS

| | | |
|---|---|---|
| 966,832 | 8/1964 | Germany |

OTHER PUBLICATIONS

Miura, Antimicrobiol Agents and Chemotherapy, 1962, Am. Soc. for Microbiology.

Miura et al., Progress in Medicinal Chem. 5, (1967), Buttersworth, London.

*Primary Examiner*—Arthur P. Demers
*Attorney, Agent, or Firm*—Johnston, Keil, Thompson & Shurtleff

[57] ABSTRACT

2-(5-nitro-2-furyl)-vinyl-1,3,4-thiadiazoles, their production and their use as bactericides and fungicides.

3 Claims, No Drawings

5-NITROFURAN COMPOUNDS

This invention relates to 2-(5-nitro-2-furyl)-vinyl-1,3,4-thiadiazoles, to their production and to thier use as bactericides and fungicides.

The compounds have the formula (I):

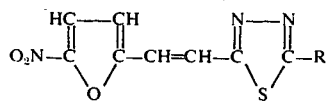 (I)

in which R is hydrogen, linear or branched alkyl of one to eighteen carbon atoms, aralkyl, aryl or heteroaryl.

Examples of alkyl of one to eighteen carbon atoms are: methyl, ethyl, propyl, isopropyl, butyl, isobutyl, sec.-butyl, amyl, hexyl, heptyl, octyl, 2-ethylhexyl, nonyl, decyl, undecyl, dodecyl, pentadecyl, hexadecyl, heptadecyl and octadecyl. Alkyl of one to four carbon atoms is preferred.

Aralkyl of seven to ten carbon atoms is particularly suitable, for example benzyl, 2-phenylethyl and 2-phenylpropyl.

Suitable aryl radicals include phenyl and naphthyl and these may bear substituents. Fluoro, chloro, bromo, nitro, trifluoromethyl, alkyl, acylated amino, dialkylated amino and alkoxy are examples of substituents which are inert under the production conditions. The acyl and alkyl radicals in the said radicals preferably have one to four carbon atoms.

Convenient heteroaryl radicals are pyridyl radicals, particularly 4-pyridyl, 3-pyridyl and 2-pyridyl.

The alkyl radicals R may also bear groups which are inert under the reaction conditions as substituents. Examples are trifluoromethyl and trichloromethyl.

The new compounds may be prepared by condensing a 2-methyl-1,3,4-thiadiazole of the formula (II):

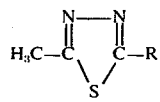 (II)

in which R has the meanings given above with 5-nitrofuraldehyde or a dialkylated or diacylated aldehyde hydrate of the same in the presence of a condensation catalyst at an elevated temperature.

The reaction may be represented for example by the following equation:

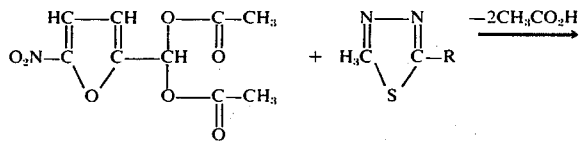 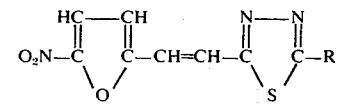 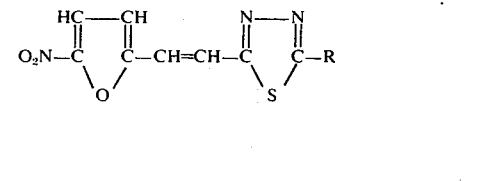

Only some of the 2-methyl-1,3,4-thialdiazoles of the formula (II) used as starting compounds have been described. They may be obtained by the method described by R Stolle in Ber. dtsch. chem. Ges., 32 (1899), 797 or for example by the process disclosed in German Laid-Open Patent Application P 21 32 019.4.

Examples of specific 2-methyl-1,3,4-thiadiazoles to be used as starting compounds are: 2,5-dimethyl-1,3,4-thiadiazole 2-methyl-5-ethylthiadiazole, 2-methyl-5-isopropylthiadiazole, 2-methyl-5-benzylthiadiazole, 2-methyl-5-(2-phenylethyl)-thiadiazole, 2-methyl-5-phenylthiadiazole, 2-methyl-5-(4-chlorophenyl)-thiadiazole, 2-methyl-5-(3-nitrophenyl)-thiadiazole, 2-methyl-5-(2-methylphenyl)-thiadiazole, 2-methyl-5-(4-pyridyl-thiadiazole, 2-methyl-5-(1-naphthyl)-thiadiazole and 2-methyl-5-(3-pyridyl)-1,3,4-thiadiazole.

Instead of 5-nitrofuraldehyde it is convenient to use an aldehyde derivative and particularly an acetal preferably derived from a lower alcohol of one to four carbon atoms such as nitrofurfural diethylacetal, or an acylal preferably derived from a lower carboxylic acid of two to four carbon atoms such as 5-nitrofurfural diacetate.

The reaction may be carried out by heating a starting compound of the formula (II) with 5-nitrofurfural or a derivative of the same at a temperature which is conveniently from 80° to 220°C in the presence of a catalyst. The preferred range of temperature is from 110° to 200°C. The reaction speed is generally very low at temperatures below 80°C. Decomposition reactions may occur at temperatures above 220°C. The reaction is generally over within a period of from a few minutes to a few hours.

Known condensation catalysts, i.e. tertiary organic bases such as pyridine or triethylamine or acid compounds such as phorphoric acid, boron fluoride or zinc chloride may be used as catalysts for the condensation.

The preferred catalyst is zinc chloride.

When an acetal or acylal is used instead of the free 5-nitrofuraldehyde naturally an acid catalyst from among the said catalysts is more convenient.

The starting materials are conveniently used in equimolar amounts but one of the compounds may be used in excess. The reaction is generally carried out at atmospheric pressure but superatmospheric or subatmospheric pressure may be used in special cases with advantage, for example superatmospheric pressure may be used conveniently when a solvent is used as whose boiling temperature the reaction speed is too low; subatmospheric pressure may be advantageous for example in the removal from the reaction mixture of volatile components formed in the reaction.

The reaction may also be carried out in the presence of a solvent, for example an alkanoic acid or anhydride such as acetic acid, propionic acid, or acetic anhydride or in an aromatic hydrocarbon, as for example benzene, toluene, o-xylene, o-chlorotoluene, and 1,4-dichlorobenzene. Under these conditions the reaction period required is generally from one hour to forty hours and particularly from 20 to 30 hours.

It is convenient to carry out the reaction without solvent only in the presence of about 0.01 to 1 mole and preferably from 0.02 to 0.2 mole of catalyst for each mole of starting material of the formula (II) and while excluding oxygen. For example 0.1 mole of starting material (II), 0.1 mole of 5-nitrofurfural diacetate and 0.01 mole of zinc chloride may be heated under nitrogen for from 12 to 36 minutes at 175° to 190°C while distilling off the acetic acid liberated. After cooling the comminuted reaction mixture is washed with ether and water, dried and the solid material is recrystallized from a suitable solvent such as o-chlorotoluene, xylene, dimethylformamide or a mixture of the same. Compounds according to the invention are obtained in the form of colored crystals which generally decompose at the melting point.

Substances according to the invention have biological activity. Surprisingly they have marked effect on fungi, bacteria and protozoa. A compound which deserves special emphasis is 2-methyl-5-2-(5-nitro-2-furyl)-vinyl-1,3,4-thiadiazole.

Examples of other compounds are:

2-ethyl-5-[2-(5-nitro-2-furyl)-vinyl]-1,3,4-thiadiazole,
2-propyl-5-[2-(5-nitro-2-furyl)-vinyl]-1,3,4-thiadiazole,
2-isopropyl-5-[2-(5-nitro-2-furyl)-vinyl]-1,3,4-thiadiazole,
2-octadecyl-5-[2-(5-nitro-2-furyl)-vinyl]-1,3,4-thiadiazole,
2-trifluoromethyl-5-[2-(5-nitro-2-furyl)-vinyl]-1,3,4-thiadiazole,
2-(2-phenylethyl)-5-[2-(5-nitro-2-furyl)-vinyl]-1,3,4-thiadiazole,
2-(4-fluorophenyl)-5-[2-(5-nitro-2-furyl)-vinyl]-1,3,4-thiadiazole,
2-(3-chlorophenyl)-5-[2-(5-nitro-2-furyl)-vinyl]-1,3,4-thiadiazole,
2-(4-bromophenyl)-5-[2-(5-nitro-2-furyl)-vinyl]-1,3,4-thiadiazole,
2-(4-nitrophenyl)-5-[2-(5-nitro-2-furyl)-vinyl]-1,3,4-thiadiazole,
2-(4-trifluoromethylphenyl)-5-[-2-(5-nitro-2-furyl)-vinyl]-1,3,4-thiadiazole,
2-(2-methylphenyl-5-[2-[2-(5-nitro-2-furyl)-vinyl]-1,3,4-thiadiazole,
2-(3-methoxyphenyl)-5-[2-(5-nitro-2-furyl)-vinyl]-1,3,4-thiadiazole,
2-(4-N,N-diethylaminophenyl)-5-[2-(5-nitro-2-furyl)-vinyl]-1,3,4-thiadiazole,
2-(4-pyridyl)-5-[2-(5-nitro-2-furyl)-vinyl]-1,3,4-thiadiazole and
2-(2-naphthyl)-5-[2-(5-nitro-2-furyl)-vinyl]-1,3,4-thiadiazole.

The compounds according to the invention may be used as effective agents for the treatment of pathological conditions in humans and animals caused by bacteria, protozoa, fungi and yeast. They are effective for example against sepsis, cystitis and trichomonas vaginalis.

Therapeutic agents or formulations having compounds according to the invention as active ingredients together with a conventional carrier material or diluent and the conventional pharmaceutical auxiliaries may be prepared by experts by known methods depending on the type of application and with a convenient dosage.

The following Examples will further illustrate the production. The parts given are parts by weight; melting points are determined with an FP 5/FP 51 unit by Mettler.

EXAMPLE 1

2-methyl-5-[2-(5-nitro-2-furyl)-vinyl]-1,3,4-thiadiazole

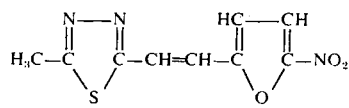

11.4 parts of 2,5-dimethyl-1,3,4-thiadiazole, 24.3 parts of 5-nitrofurfural diacetate and 1 part of zinc chloride are heated in a stirred apparatus for half an hour at 180°C while passing through a stream of nitrogen at the rate of 10 liters per hour so that the acetic acid liberated is distilled off. After the product has cooled the reaction mixture is comminuted and washed with ether and water, and the solid obtained is recrystallized from o-chlorotoluene. 15 parts of 2-methyl-5 2-(5-nitro-2-furyl)-vinyl-1,3,4-thiadiazole having a melting point of 236°C is obtained; this is equivalent to 63% of theory.

EXAMPLE 2

2-phenyl-5-[2-(5-nitro-2-furyl)-vinyl]-1,3,4-thiadiazole

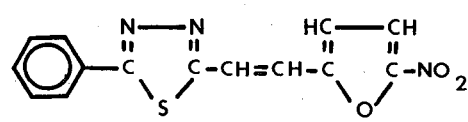

8.8 parts of 2-methyl-5-phenyl-1,3,4-thiadiazole, 12.2 parts of 5-nitrofurfural diacetate and 1 part of zinc chloride are heated in a stirred apparatus for half an hour at 180°C to 190°C while passing a stream of nitrogen through at a rate of 10 liters per hour so that acetic acid liberated is distilled off. After the reaction mixture has been cooled it is washed with ether and water, dried and recrystallized from o-chlorotoluene. 11.5 parts of 2-phenyl-5- 2-(5-nitro-2-furyl)-vinyl -1,3,4-thiadiazole having a melting point of 217°C is obtained, corresponding to 76.5% of theory.

EXAMPLE 3

2-(2-chlorophenyl)-5-[2-(5-nitro-2-furyl)-vinyl]-1,3,4-thiadiazole

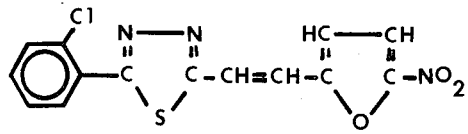

10.5 parts of 2-methyl-5-(2-chlorophenyl)-1,3,4-thiadiazole (melting point 83°C), 12 parts of 5-nitrofurfural diacetate and 1 part of zinc chloride are heated for half an hour at 180°C while passing through a stream of nitrogen at the rate of 10 liters per hour so that the acetic acid liberated is distilled off. After the reaction mixture has cooled it is washed with ether and water, dried and recrystallized from a mixture (1:1) of xylene and dimethylformamide. 13.5 parts of 2-(2-chlorophenyl)-5-[2-(5-nitro-2-furyl)-vinyl]-1,3,4-thiadiazole having a melting point of 275°C is obtained, corresponding to 79.5% of theory.

EXAMPLE 4

2-(4-chlorophenyl)-5-[2-(5-nitro-2-furyl)-vinyl]-1,3,4-thiadiazole

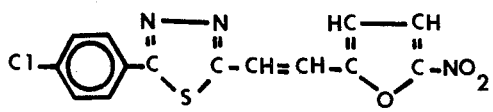

10.5 parts of 2-methyl-5-(4-chlorophenyl)-1,3,4-thiadiazole (melting point 139°C), 12.2 parts of 5-nitrofurfural diacetate and 1 part of zinc chloride are heated at 180°C for half an hour while passing a stream of nitrogen through at the rate of 10 liters per hour so that acetic acid liberated is distilled off. The reaction mixture is cooled, washed with ether and water, dried and recrystallized from a mixture (1:1) of xylene and dimethylformamide. 13.0 parts of 2-(4-chlorophenyl)-5- 2-(5-nitro-2-furyl)-vinyl - 1,3,4-thiadiazole having a melting point of 225°C is obtained, corresponding to 78% of theory.

The substances in a liquid nutrient medium are tested for their activity against microorganisms in conventional series dilution tests. The effectiveness of 2-methyl-5- 2-(5-nitro-2-furyl)-vinyl -1,3,4-thiadiazole (A) is illustrated in Table 1 and is compared with that of 5-nitrofurfural semicarbazone (a) and 5-nitro-2-furfuryl methyl ether (b) in Tables 2 to 4. The following abbreviations are used:

∅ = no growth
(+) = slight growth
\+     = slightly more growth
++   = moderate growth
+++ = full growth. i.e. no effect
Da = 1:10,000    Dd = 1:1,000,000
Db = 1:100,000   De = 1:2,000,000
Dc = 1:500,000

Table 1

| Dilution | De | Db | Dc | Dd | De |
|---|---|---|---|---|---|
| Trichomonads | — | — | — | ∅ | +++ |
| Staphylococci 5 | ∅ | ∅ | ∅ | + | |
| Staphylococci 7 | ∅ | ∅ | +++ | +++ | |
| E. coli 1 | ∅ | ∅ | ∅ | ∅ | |
| E. coli 3 | ∅ | ∅ | ∅ | (+) | |
| Shigsonnei | ∅ | ∅ | ∅ | ++ | |
| Trichoph. ment. | ∅ | ∅ | ∅ | ++ | |
| Trichoph. rubrum | ∅ | ∅ | + | +++ | |
| Microsp. canis | ∅ | ∅ | ∅ | +++ | |
| Ep. flacc. | ∅ | ∅ | (+) | +++ | |
| Microsp. gypseum | ∅ | ∅ | ∅ | + | |
| Cand. albicans | ∅ | ∅ | +++ | +++ | |
| Cand. tropic | ∅ | ∅ | +++ | +++ | |

Table 2

| Substance | Effectiveness against Staph. aureus | |
|---|---|---|
| | (a) | A |
| Minimum inhibiting concentration (µg/ml) | 8 | <2 |

Table 3

| Substance | Effectiveness against Trichoph. ment. | |
|---|---|---|
| | (b) | A |
| Minimum inhibiting concentration (µg/ml) | 128 | <2 |

Table 4

| Substance | Effectiveness against Microsp. gypseum | |
|---|---|---|
| | (b) | A |
| Minimum inhibiting concentration (µg/ml) | 128 | <2 |

Tables 2 to 4 compare the effectiveness of 2-methyl-5-[2-(5-nitro-2-furyl)-vinyl]-1,3,4-thiadiazole (A) with known compounds. The superiority of the compound according to the invention is clearly shown by the four to sixty-four fold stronger effect. The known compounds are obtainable commercially for example under the trade marks: (a) FURACIN[(R)] and (b) FURASPOR.

We claim:
1. A 5-nitrofuran compound of the formula;

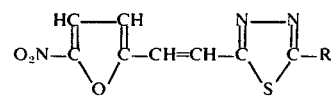     (I)

in which
R is alkyl of one to four carbon atoms.
2. 2-methyl-5-[2-(5-nitro-2-furyl)-vinyl]-1,3,4-thiadiazole.
3. A process for the production of a compound having the formula given in claim 1 wherein a 2-methyl-1,3,4-thiadiazole of the formula (II):

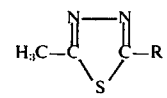     (II)

in which R has the meanings given in claim 1 is condensed with 5-nitrofuraldehyde or a dialkylated or diacylated derivative of the same in the presence of a condensation catalyst at elevated temperature.

* * * * *